United States Patent

[11] 3,608,962

| [72] | Inventor | Hillery G. Knecht<br>552 Kinglsey Trail, Bloomfield Hills, Mich. 48013 |
|---|---|---|
| [21] | Appl. No. | 851,219 |
| [22] | Filed | Aug. 19, 1969 |
| [45] | Patented | Sept. 28, 1971 |

[54] SAFETY BELT AND COUPLING DEVICE
8 Claims, 7 Drawing Figs.

[52] U.S. Cl. .................................................. 297/385,
297/389, 24/211 L
[51] Int. Cl. .................................................. B60r 21/10
[50] Field of Search ........................................... 297/385,
389; 24/211 (2), 230 AM, 230 AN, 123, 123.1,
126 B, 136 A, 211; 182/3, 4; 87/8, 9; 119/96

[56] References Cited
UNITED STATES PATENTS

| 2,393,530 | 1/1946 | Harris .......................... | 87/9 |
| 3,388,886 | 6/1968 | Tucker ........................ | 297/385 X |

FOREIGN PATENTS

| 242,902 | 6/1946 | Switzerland .................. | 24/211 L |

*Primary Examiner*—James C. Mitchell
*Attorney*—Dale A. Winnie

ABSTRACT: A safety belt of soft round braided rope with a coupling which includes male and female parts having ball wedging snap-lock interengagement therebetween and are under the control of an outer-disposed reciprocal sleeve member.

PATENTED SEP 28 1971 3,608,962

INVENTOR.
Hillery G. Knecht
BY
D.A. Winnie
ATTORNEY

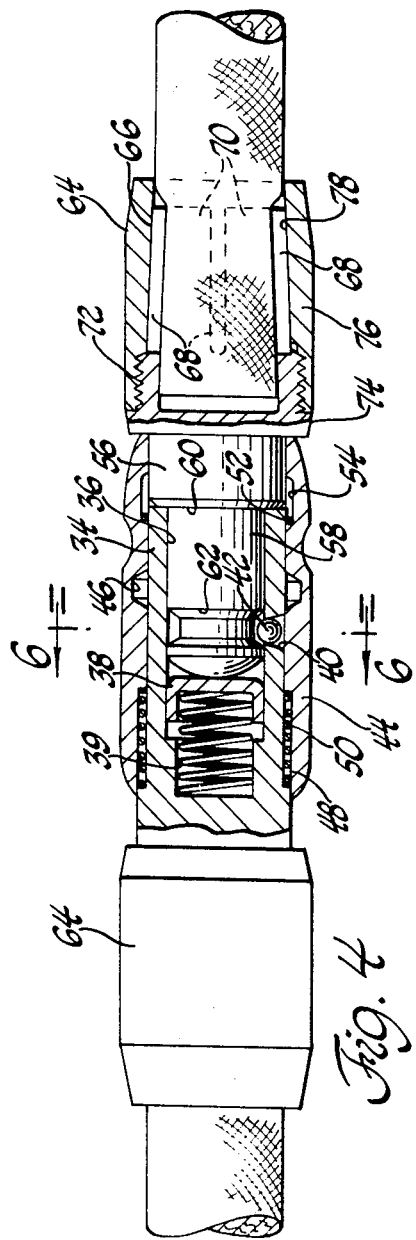
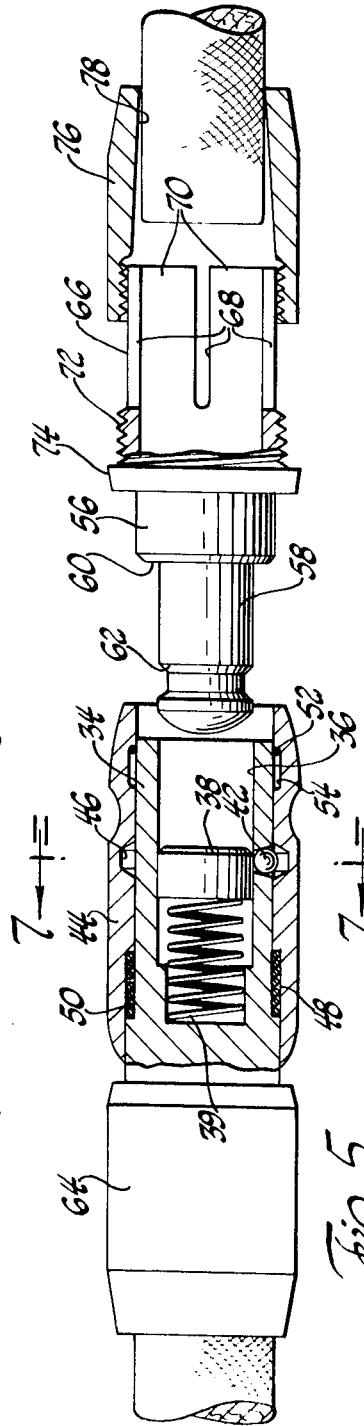
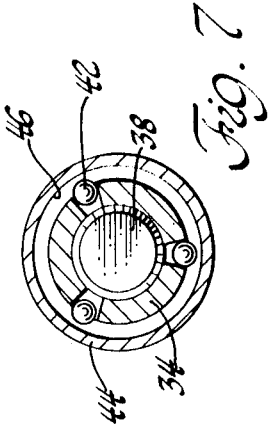
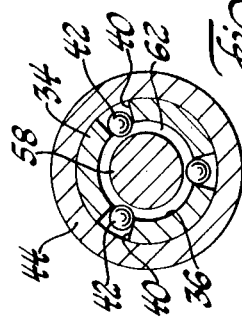

SAFETY BELT AND COUPLING DEVICE

BACKGROUND OF THE INVENTION

Conventional seat belt and shoulder strap constructions that are used in automotive vehicles, aircraft, boats, amusement rides, etc., have always included a flat webbed belt with a buckle device of inconvenient size, shape, weight and undue complexity.

The flat webbed belt adds appreciable cost to such safety devices because its ends must be folded back and sewed over connecting parts at both ends of each strap. This folding and sewing requires handling time at several work stations for varying types of connections, and double and cross-stitching is almost always necessary to provide a belt meeting required safety standards.

The web-type belt is also difficult to retract and store, when not in use. A variety of retracting devices have been tried to simplify this problem but have only created new problems when, for example, the strap becomes twisted and cannot be wound upon the retractor or the size and weight of the strap are such that the inclusion of a spring of sufficient strength to properly retract the belt by rolling it up, is not practical or economically feasible.

Finally, the buckling devices used with commonly known safety seat belts all require a specific orientation with respect to the user and with respect to the connecting portions of the belt. In most cases, the male and female members of the buckle must be brought into parallel alignment, after untwisting the webbed belt, to insure proper engagement, and a faceup orientation is necessary (1) for relative adjustment on the wearer to provide reasonable comfort, and (2) to enable access to the release catch, for disengagement.

SUMMARY OF THE PRESENT INVENTION

The present invention makes use of a relatively soft, round rope-type belt, that is more easily handled on a flat reel or by other retractor means, requires no stitching for attachment to buckle parts, and is soft and comfortable for the user. It also includes a new and novel type buckle which compliments the belt shape, readily receives and holds the belt ends securely, provides extremely quick connect and disconnect capabilities, and has no appreciable size or weight to cause user discomfort.

The round ropelike belt is of a soft, fibrous, thermoplastic material, in a lock-stitch or like braid, with the necessary holding strength of conventional flat belts but with the advantage of user comfort in fitting body folds and being more readily engaged and securely held to anchoring means, retractor parts, and buckle or coupling members by collet sleeve or other mechanical means.

The buckle or coupling for the safety belt is small, compact, ans simple in construction. It is cylindrical in form, rather than flat, and makes use of a sleeve part for the release catch that is readily accessible, instinctively operable in an emergency, and is completely independent of the strain or tension on the belt parts. No leverage or spring tension is involved in the coupling or uncoupling of belt end parts. Instead, there is a fool-proof ball-wedge engagement, or entrappment, that assures positive locking and retention in the first instance, and a quick release, when the ball members are free.

DESCRIPTION OF THE DRAWING FIGURES

FIG. 4 is an enlarged and partially cross-sectioned view of one of the belt end coupling devices shown in the previous drawing figures.

FIG. 5 is similar to the preceding drawing figure with the coupling device disconnected and a belt end retainer or fastener shown in exploded view at one end.

FIG. 6 is a cross-sectional view taken in the plane of line 6—6 of FIG. 4 to show the ball-wedge entrappment that locks the coupling parts together.

FIG. 7 is similar to the preceding drawing figure but is taken in the plane of line 7—7 of FIG. 5 to show the unlatched condition of the female coupling part.

DETAILED DESCRIPTION

Figure 1:
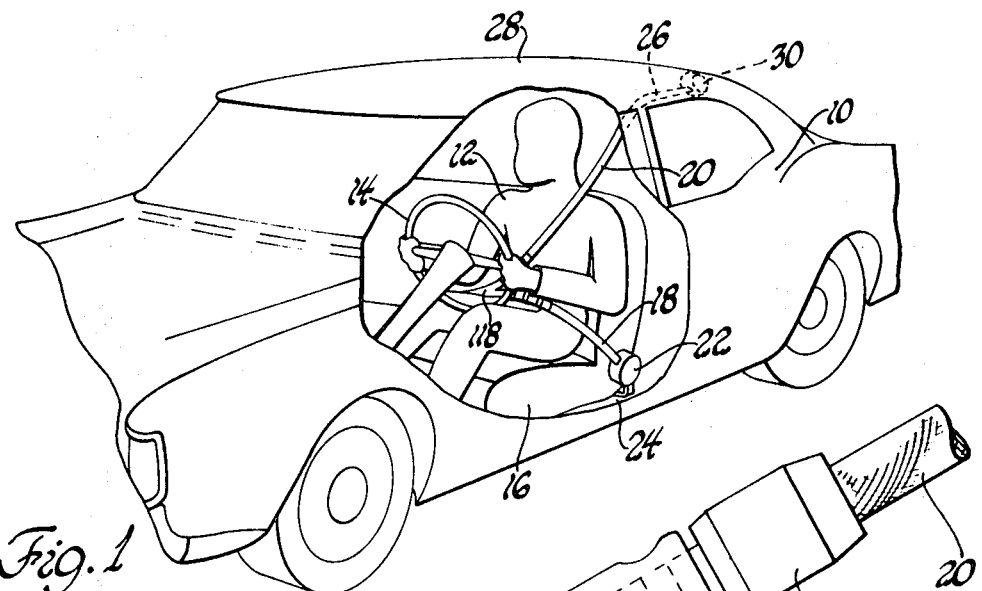
FIG. 1 is a perspective view of a motor vehicle with a section broken away to show the driver and the safety belt arrangement of the present invention in use.

The automotive vehicle 10, in the first drawing figure, has a sidewall section cut away to show a driver 12 behind a steering wheel 14 and on a seat 16 with a seat belt 18 across his waist and a shoulder harness strap 20 diagonally across his body.

The seat belt 18 is shown with its left end extending into a retractor 22, which is, in turn, secured to the vehicle floor 24, in a more-or-less conventional manner. The shoulder harness strap 20, however, extends into a tube or conduit 26 within the vehicle roof 28 and connects to a retractor 30 which, in this instance, is within the rear quarter panel, behind the head liner, where there is more room to accommodate it and it can be completely hidden from view.

The other end of the seat belt 18 is identified as 118 and can just barely be seen through the steering wheel 14 in the first drawing figure. The shoulder harness strap 20 is also shown in this view, but more clearly in FIG. 2, as connected to a short end 120 that is spliced into the belt end 118.

It will be appreciated, and is intended as understood, that the seat belt end 118 may be directly anchored to the vehicle floor 24, on the other side of the driver, or may be connected into a retractor or retractor tube arrangement like either of the two shown and previously mentioned. It should also be obvious that a like seat belt and shoulder harness arrangement is used on the other side of the car, for the front seat passenger, and that just the seat belt arrangement, with the particular coupling device yet to be described, is used in the back seat where shoulder straps are not required.

From the foregoing, it can be seen that there is a general similarity in the safety arrangement of the seat belts and shoulder straps of the present invention with those presently known. The main differences suggested thus far are in the use of a soft rope-type belt and strap, having the shoulder strap end 120 spliced or otherwise connected into the seat belt end 118, and the use of a different type of retractor means, through a conduit passage.

The seat belt and shoulder strap rope of the present invention is preferably a hollow core diamond braided rope of high density polyethylene filaments or strands to assure softness and high tensile strength. It has low elasticity so that the stretch factor is of no consequence and it is light in weight. It will not absorb water, is resistant to most acids, alkalies and other chemicals, and is not attacked by mildew.

It is a thermoplastic material, which enables cut ends to be heat-sealed but it is not affected by temperatures that are normally experienced in general use.

A solid braid with lock-stitched strands, where there is very little core and the strands carry the rope strength, will wear better than most other rope but there is an inherent resilience which introduces problems of elongation.

A maypole braid, with core strands, has a minimum of mechanical stretch and good strength efficiency but it is not as easy to splice as the hollow core braids.

A braid-on-braid or a double-braid rope offers great strength efficiency in rope diameters of ½-inch and larger. They are also soft with a relatively smooth exterior and are very flexible without tending to kink or hockle.

Besides the other advantages mentioned for the hollow braid rope, which is preferred, is that it can be made to have a round or somewhat flat shape, depending on the relative size of the hollow core area. With a ¾-inch size double-strand diamond weave, there is much the same body contact as with webbed belts which tend to curl at their edges.

Figure 2:
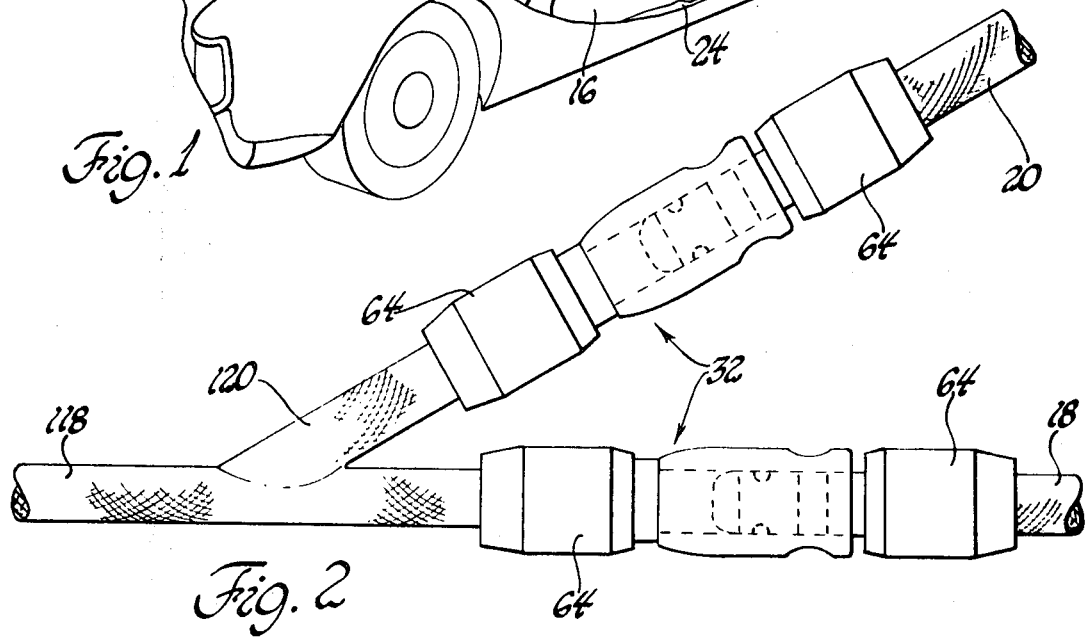
FIG. 2 is a plan view of one form of the safety belt arrangement of the present invention.

The seat belt and shoulder harness arrangement shown in FIG. 2 makes use of two coupling devices 32, which are both the same, by having one between the seat belt ends 18 and 118, while the other between the shoulder strap parts 20 and 120.

The belt end 18 and strap end 20 have the male part of the coupling fastened to them while the belt end 118 and spliced end 120 have the female parts of the couplings fastened to them.

The strap end part 120 may be provided by forming a bite at the end of the seat belt rope 118 and splicing the rope end into the hollow core rope section, and then cutting the bite, or by using a separate short piece of rope. In either instance, the spliced part will be understood as fixed by heat-sealing, or some means other then sewing.

Figure 3:
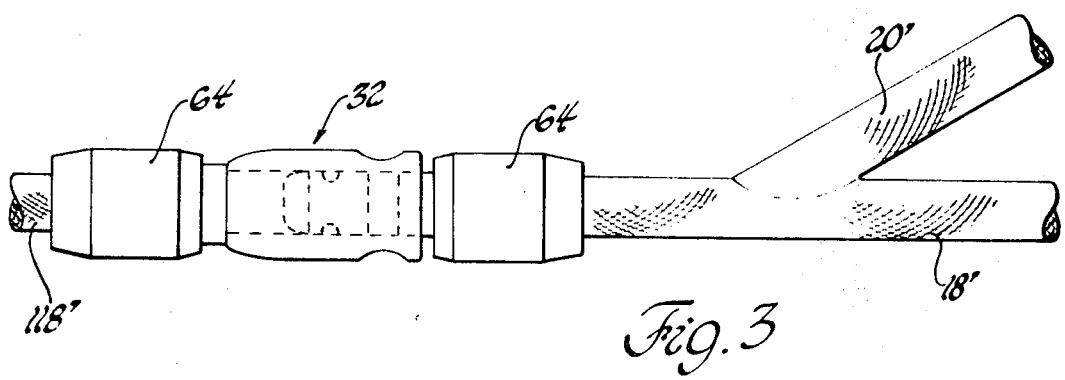
FIG. 3 is an alternative form or embodiment of the safety belt arrangement of the present invention.

In the arrangement shown in FIG. 3, the seat belt and shoulder strap parts identified as 18' and 20' respectively, are spliced together and only one coupling 32 is needed to connect them to the seat belt part 118'. In this particular embodiment, it will be appreciated that the means used to fasten the male coupling part to the end of belt 18' will also serve to fix the spliced end of strap 20' into belt 18' so that no other fastener means will be necessary.

The actual construction of the coupling devices 32 is best shown in FIGS. 4 and 5.

They include a female part 34 which is cylindrical in shape and relatively short in length. It has a center hole 36 that is open at one end and includes a plunger 38 backed by a spring 39 in its blind end.

Within the biased range of the plunger 38, in the part 34, are provided three circumferentially spaced apertures, or ball seats 40, and in them are spherical balls 42 sized to extend into the center hole 36 but not fall through into center passageway. These provide for the locking engagement of the male part, and its release when they are allowed to be backed out of the way.

A sleeve member 44 is received about the part 34 and when its inner wall surface is over the balls 42, as shown in FIG. 4, they are held in their seats 40 and caused to project into the center hole 36. However, the sleeve 44 includes an inner annular groove 46 which will allow the balls 42 to be withdrawn from the center hole 36 when the sleeve is positioned as shown in FIG. 5.

A shoulder groove 48 in one end of the sleeve member 44 has a spring 50 in it to bias the sleeve in the position shown in FIG. 4. This puts the ball groove ahead of the ball seats 40 and holds the balls 42 in their inwardly disposed wedge locking position.

A lock ring 52 in a groove 54 at the other end of sleeve 44 provides limit stops for the travel of the sleeve and in the sleeve's retracted position, as shown by FIG. 5, assures alignment of the ball groove 46 with the spherical balls 42 so that they can escape radially outward.

The male part of the coupling is identified as 56 in the drawings and is shown in include an end 58 that fits the center hole 36 in the female part 34. It has a shoulder flange 60 which, when abutting the end of part 34, disposes an annular groove on its male end 58 in relative alignment with the ball seats 40 so that the ball members 42 can be engaged therein.

When end 58 is inserted in part 34, it pushes plunger 38 out of the way and loads spring 39. Consequently, when sleeve 34 is pulled back, to release the balls 42 into the ball groove 46, the plunger 38 helps push the male part out and causes the balls 42 to fly radially outward. It then moves under the ball seats 40 causing the balls 42 to lock the sleeve in its retracted position.

The means for fastening and retaining belt ends to coupling and anchoring parts is shown in FIGS. 1-3 at opposite ends of the coupling device 32 and are identified by the numeral 64. They are, however, best shown in FIGS. 4 and 5 as used with the male member 56 of the coupling device 32.

Each fastening means 64 includes a thin-walled tubular part 66 which is part of the member that is to be fastened to a belt end. The thin walls are cross-slit, as at 68, so that the wall sections 70 can be squeezed tightly about a belt end and an externally threaded area 72, behind a shoulder flange 74, is receptive of an internally threaded collar or collet member 76.

The collet like collar 76 has an internally narrowing taper 78 towards its outer end, so that the wall sections 70 are squeezed together at their ends to bite into the rope behind its terminal end and prevent it from being pulled out.

I claim:

1. A safety seat belt, comprising a relatively round soft braided rope having a coupling device provided between the ends thereof and in axial alignment therewith, said rope being diamond braided construction with high density thermoplastic fibrous strands, and means carried by said coupling device for radially clamping and securing said ends to said coupling device in a manner so as to both preserve the relative roundness of said rope while placing said ends of said rope in general axial alignment with each other.

2. A safety seat belt construction for automotive and other vehicles, comprising a relatively round soft thermoplastic braided rope member having means for fixedly attaching respectively opposite ends thereof to a vehicular body on relatively opposite sides of a seat provided therewithin, and a coupling device provided between the aforementioned ends of said rope member and including interfitting male and female parts having a wedge locking means of interengagement therebetween and a sleeve member axially reciprocal for releasing said wedge locking means and allowing the separation of said coupling parts, said wedge locking means including ball members retained by said female part for interference engagement with said male part, and said sleeve member being disposed about said female part and having an annular groove receptive of said ball members therewithin.

3. The safety seat belt construction of claim 2, including
   a spring biased member in said female part for holding said ball members in the annular groove of sleeve member, and the sleeve member retracted, prior to receipt of said male part therewithin.

4. The safety seat belt construction of claim 3,
   said spring biased member yielding to the forcible entry of said male part into said female part and releasing said sleeve upon the interference engagement of said ball members with said male part.

5. The safety seat belt construction of claim 4,
   said spring biased member being compressed by said male member for service in ejecting the latter upon the ball releasing retraction of said sleeve member.

6. A safety seat belt and shoulder harness strap construction for use in automotive and other vehicles, and comprising;
   a relatively round diamond braided rope member having forked ends provided by a like rope member part backspliced into engagement therewith,
   coupling members provided on each of said forked ends and cooperating seat belt and shoulder harness strap members of like braided rope construction engaged therewith.

7. The safety seat belt and shoulder harness strap of claim 6,
   said diamond braided rope being at least ¾-inch in diameter of high density polyethylene filaments, with a high tensile strength, no appreciable stretch and a resistance to kinking.

8. A safety seat belt assembly, comprising first and second relatively round soft braided rope sections, a first end of said first rope section being adapted for connection to a related anchor, a first end of said second rope section also being adapted for connection to a related anchor, respective second ends of said first and second rope sections being operatively connected to an associated coupling device whereby said second ends are effectively coupled together in substantially axially aligned relationship, said coupling device comprising first and second coupling portions, said first coupling portion comprising a first housing including an axially extending passage formed therein with an open end formed in an end of said first housing, clearance aperture means formed in a wall of said housing so as to communicate with said passage, detent means generally located within said clearance aperture means and effective to at times extend within said passage, plunger means situated within said passage, first resilient means biasing said plunger means toward said open end to a position whereat said plunger effectively engages said detent means causing said detent means to withdraw from said passage, sleevelike means carried by said first housing externally thereof, said sleevelike means comprising annular recess means formed generally internally of said sleevelike means so as to be open toward said first housing, second resilient means effective for urging said sleevelike means generally axially of said first housing and in the direction of said open end, said sleevelike means having at least two operating positions, one of said operating positions being a generally retracted position wherein the resilient urging of said second resilient means is relatively greater, a second of said operating positions being a generally extended position wherein the resilient urging of said second resilient means is relatively lesser, said annular recess means being so located axially of said sleevelike means so as to be effective for at least partially receiving therein said detent means when said sleevelike means is in said first retracted position and said plunger means is effectively engaging and causing said detent means to withdraw from said passage, said second coupling portion comprising a probelike latching member adapted to be received within said passage, second recess means formed near an extending end of said probelike latching member, said extending end of said probelike latching member being effective upon insertion thereof into said passage to axially displace said plunger means thereby permitting said detent means to at least partially extend into said passage and be partly received within said second recess means, and said second resilient means being effective upon said detent means being partly received within said second recess means to move said sleevelike means axially toward said open end so as to axially displace said first mentioned recess means and thereby forcibly retain said detent means within said second recess means.